United States Patent
Cook (10) Patent No.: US 10,951,243 B2
(45) Date of Patent: Mar. 16, 2021

(54) WIRELESS SYSTEM HAVING DIVERSE TRANSMISSION PROTOCOLS

(71) Applicant: Shure Acquisition Holdings, Inc., Niles, IL (US)

(72) Inventor: Thomas H. Cook, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 16/522,731

(22) Filed: Jul. 26, 2019

(65) Prior Publication Data
US 2021/0028796 A1 Jan. 28, 2021

(51) Int. Cl.
*H04B 1/00* (2006.01)
*H04B 1/3827* (2015.01)
(Continued)

(52) U.S. Cl.
CPC .......... *H04B 1/005* (2013.01); *H04B 1/3827* (2013.01); *H04M 3/56* (2013.01); *H04N 7/14* (2013.01);
(Continued)

(58) Field of Classification Search
CPC . H04B 1/005; H04B 1/3827; H04L 29/06448; H04L 29/06476; H04L 12/1827;
(Continued)

(56) References Cited

U.S. PATENT DOCUMENTS 7,933,561 B2 4/2011 Sanguinetti
8,051,480 B2 11/2011 Mahaffey
(Continued)

FOREIGN PATENT DOCUMENTS

CN 102075207 A 5/2011
CN 105306088 A 2/2016
(Continued)

OTHER PUBLICATIONS

"How real simultaneous dual band Wi-Fi enables next-generation in-vehicle connectivity" https://www.embedded.com/electronics-blogs/say-what-/4460853/2/How-real-simultaneous-dual-band-Wi-Fi-enables-next-generation-in-vehicle-connectivity, Jul. 3, 2018.
(Continued)

*Primary Examiner* — Yuwen Pan
*Assistant Examiner* — Paul P Tran
(74) *Attorney, Agent, or Firm* — Banner & Witcoff, Ltd.

(57) ABSTRACT

A first plurality of wireless devices each having a microphone and a wireless antenna forming a first plurality of microphones and a first plurality of wireless antennas may be provided. The first plurality of wireless devices may be configured to transmit the first plurality of signals over Bluetooth. A master transceiver with a first microphone and a first wireless antenna may also be provided and the master transceiver can be configured to receive the plurality of signals from the plurality of wireless devices over Bluetooth. The master transceiver can be configured to combine the plurality of signals and the master signal into a combined signal. And the master transceiver can be configured to broadcast the combined signal over Bluetooth and Wi-Fi simultaneously with the transmission over Bluetooth for redundancy.

21 Claims, 7 Drawing Sheets

(51) Int. Cl.

| | |
|---|---|
| *H04R 3/00* | (2006.01) |
| *H04R 1/40* | (2006.01) |
| *H04M 3/56* | (2006.01) |
| *H04N 7/14* | (2006.01) |
| *H04W 88/06* | (2009.01) |
| *H04W 4/16* | (2009.01) |
| *H04M 1/725* | (2006.01) |

(52) U.S. Cl.
CPC ............. *H04R 1/406* (2013.01); *H04R 3/005* (2013.01); *H04M 1/7253* (2013.01); *H04M 1/72519* (2013.01); *H04R 2420/07* (2013.01); *H04W 4/16* (2013.01); *H04W 88/06* (2013.01)

(58) Field of Classification Search
CPC ......... H04L 45/22; H04L 45/28; H04L 51/36; H04L 65/60; H04M 1/72519; H04M 1/7253; H04M 3/42246; H04M 3/56; H04M 3/561; H04M 3/568; H04M 7/0039; H04M 2207/18; H04M 2250/50; H04M 2250/62; H04N 7/142; H04N 7/147; H04N 7/148; H04N 2007/145; H04S 3/008; H04S 7/303; H04S 7/304; H04S 7/40; H04R 1/00; H04R 1/406; H04R 3/005; H04R 5/02; H04R 5/04; H04R 2420/07; H04W 4/06; H04W 4/12; H04W 4/16; H04W 4/80; H04W 12/06; H04W 12/0608; H04W 36/03; H04W 40/02; H04W 76/14; H04W 76/23; H04W 88/06; H04W 88/10; G06F 3/88165
USPC ................. 455/416; 348/14.02, 14.08, 14.09
See application file for complete search history.

(56) References Cited

U.S. PATENT DOCUMENTS

| | | | |
|---|---|---|---|
| 8,203,977 | B2 | 6/2012 | Walley et al. |
| 8,288,641 | B2 | 10/2012 | Wilson |
| 8,599,709 | B2 | 12/2013 | Chen et al. |
| 8,606,182 | B2 | 12/2013 | Wyper et al. |
| 8,611,317 | B2 | 12/2013 | Banerjea et al. |
| 8,624,785 | B2 | 1/2014 | Chen |
| 8,706,032 | B2 | 4/2014 | Zhang et al. |
| 8,767,536 | B2 | 7/2014 | Himayat et al. |
| 8,824,966 | B2 | 9/2014 | Boes |
| 8,843,075 | B2 | 9/2014 | Kenkel et al. |
| 8,867,509 | B2 | 10/2014 | De Maaijer |
| 9,014,027 | B2 | 4/2015 | Hayes et al. |
| 9,021,049 | B2 | 4/2015 | Bai et al. |
| 9,059,971 | B2 | 6/2015 | Graham et al. |
| 9,155,103 | B2 | 10/2015 | Wietfeldt et al. |
| 9,215,186 | B2 | 12/2015 | Himayat et al. |
| 9,363,005 | B2 | 6/2016 | Mahe et al. |
| 9,408,018 | B2 | 8/2016 | Qian |
| 9,451,425 | B2 | 9/2016 | Pollack et al. |
| 9,485,778 | B2 | 11/2016 | Linde et al. |
| 9,572,198 | B1* | 2/2017 | Shah ...................... H04W 92/02 |
| 9,628,915 | B2 | 4/2017 | Yao |
| 9,674,341 | B1* | 6/2017 | Pakidko ............ H04M 3/42391 |
| 9,900,740 | B2 | 2/2018 | Pandian |
| 9,912,602 | B2 | 3/2018 | Himayat et al. |
| 9,961,600 | B2 | 5/2018 | Gopal et al. |
| 10,531,316 | B1* | 1/2020 | Ichapurapu ............ H04W 76/23 |
| 2005/0286546 | A1 | 12/2005 | Bassoli et al. |
| 2009/0264114 | A1* | 10/2009 | Virolainen ............... H04M 3/56 |
| | | | 455/416 |
| 2010/0227597 | A1* | 9/2010 | Guccione ............ H04M 1/7253 |
| | | | 455/416 |
| 2010/0271983 | A1* | 10/2010 | Bryant .................... H04B 1/385 |
| | | | 370/277 |
| 2012/0052802 | A1* | 3/2012 | Kasslin ................. H04W 48/12 |
| | | | 455/41.2 |
| 2012/0314890 | A1* | 12/2012 | El-Hoiydi ............ H04R 25/558 |
| | | | 381/315 |
| 2013/0171975 | A1 | 7/2013 | Lindner et al. |
| 2014/0135061 | A1 | 5/2014 | Rousu et al. |
| 2014/0342780 | A1 | 11/2014 | Ruegg |
| 2015/0109897 | A1* | 4/2015 | Lee .......................... H04W 4/80 |
| | | | 370/216 |
| 2016/0112073 | A1 | 4/2016 | Lum et al. |
| 2017/0135014 | A1* | 5/2017 | Li ...................... H04W 36/0011 |
| 2017/0245067 | A1* | 8/2017 | El-Hoiydi ............ H04R 25/554 |
| 2019/0007110 | A1 | 1/2019 | Gulbay et al. |
| 2019/0297119 | A1* | 9/2019 | Vashisht .............. H04L 65/4023 |
| 2019/0380138 | A1* | 12/2019 | Zhang ................... H04L 1/1819 |
| 2020/0064865 | A1* | 2/2020 | Lei ........................ G05D 1/0295 |

FOREIGN PATENT DOCUMENTS

| | | |
|---|---|---|
| CN | 206894637 U | 1/2018 |
| CN | 107969011 A | 4/2018 |
| CN | 207518592 U | 6/2018 |
| CN | 108616547 A | 10/2018 |
| WO | 12031477 A1 | 3/2012 |

OTHER PUBLICATIONS

Yes! Wi-Fi and Bluetooth Can Coexist in Handheld Devices, Ronak Chokshi, Technical Marketing Engineer Emerging and Embedded Business Unit, Marvell Semiconductor, Inc., Mar. 2010, https://www.marvell.com/wireless/assets/Marvell-WiFi-Bluetooth-Coexistence.

Wi-Fi and Bluetooth Combo Enables Simultaneous Streaming for Multiple In-Car Devices—Slovick—Jan. 18, 2018.

Blue-Fi: enhancing Wi-Fi performance using bluetooth signals, Jun. 2009.

"Wi-Fi (IEEE 802.11b) and Bluetooth Coexistence Issues and Solutions for the 2.4 GHz ISM Band Matthew B. Shoemake, Ph.D.", Feb. 2001, Ver 1.1.

Qualcomm Revolutionizes Smartphones and Computing Devices with Game-Changing Wi-Fi 6 and Bluetooth 5—Feb. 25, 2019—Barcelona.

* cited by examiner

WIRELESS SYSTEM HAVING DIVERSE TRANSMISSION PROTOCOLS

FIELD

The disclosure relates generally to wireless systems for simultaneous streaming within a radio frequency ("RF") diversity scheme.

BACKGROUND

Certain transmitters, such as mobile device transmitters, may utilize either Bluetooth or Wi-Fi transfer protocols in isolation to stream content, such as audio, to a receiving device. Bluetooth devices may be used in situations where low power is required. And Wi-Fi streaming devices may be used in situations where higher power is available and longer distances of transmission are required. Transmitters may use either Bluetooth or Wi-Fi protocols in isolation to stream audio to a single receiving device.

BRIEF SUMMARY

The following presents a simplified summary of the disclosure in order to provide a basic understanding of some aspects of the disclosure. This summary is not an extensive overview of the disclosure. It is not intended to identify key or critical elements of the invention or to delineate the scope of the invention. The following summary merely presents some concepts of the disclosure in a simplified form as a prelude to the more detailed description provided below.

In one example, both Bluetooth and WiFi may be used cognitively in a diversity arrangement so that the benefits of both technologies may be realized in the same system. For example, a plurality of wireless devices each having a microphone and a wireless antenna forming a plurality of microphones and a plurality of wireless antennas can be provided where the plurality of microphones may be configured to convert sound waves from a plurality of sources into a plurality of signals. And the plurality of wireless devices may be configured to transmit the first plurality of signals over Bluetooth. In this example, a master transceiver can be provided with a first microphone and a first wireless antenna and the first microphone may be configured to convert sound waves from a master source into a master signal. The master transceiver can be configured to receive the plurality of signals from the plurality of wireless devices over Bluetooth and the master transceiver can be configured to combine the plurality of signals and the master signal into a combined signal. Additionally, the master transceiver can be configured to broadcast the combined signal over Bluetooth and the master transceiver can be configured to broadcast the combined signal over Wi-Fi simultaneously with the transmission over Bluetooth.

Additionally or in an alternative example, a receiver can be provided and can be configured to receive the combined signal from the master transceiver over the first wireless protocol. The combined signal may include data packets and the receiver can be configured to determine whether each of the data packets of the combined signal have been received. The receiver may be configured to extract data of any packet not received from the second transmission protocol. The receiver may be configured to also act as a transceiver and can be configured to transmit the combined signal over a 5G protocol to a network.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. References to "embodiment," "example," etc., indicate that the embodiment(s) or example(s) of the invention so described may include particular features, structures, or characteristics, but not every embodiment or example necessarily includes the particular features, structures, or characteristics. Further, it is contemplated that certain embodiments or examples may have some, all, or none of the features described for other embodiments. And it is to be understood that other embodiments may be utilized and structural and functional modifications may be made without departing from the scope of the present disclosure.

Unless otherwise specified the use of the serial adjectives, such as, "primary," "secondary," "first," "second," "third," etc., used to describe components, are used only to indicate different components, which can have similar features and functionality. But the use of such serial adjectives and are not intended to imply that the components must be provided in given order, either temporally, spatially, in ranking, or in any other way.

Examples of the disclosure may be provided in one of hardware, firmware, and software or any combinations thereof. Also aspects of the disclosure may also be provided as instructions stored in or on a computer-readable medium, which can in certain instances be read and executed by one or more processors, within one or more computers, devices as discussed herein, or other devices, to enable the operation of the functions described herein. Such instructions can be in the form of program modules, which may include routines, programs, objects, components, data structures, etc. that perform particular tasks or implement particular abstract data types when executed by a processor in a computer or other device. The instructions or modules may be written in a source code programming language that is subsequently compiled for execution, or may be written in a scripting language such as, e.g., HTML, XML, JavaScript, Python, and the like. The computer-readable medium can comprise any components for storing information in readable format by one or more computing devices, e.g., tangible storage medium, such as a hard disk, removable storage media, solid state memory, read only memory (ROM), random access memory (RAM), optical storage media, a flash memory device, magnetic disk storage media, removable storage media, solid state memory, virtual storage, cloud based storage, and other known memory types and combinations thereof. Also the features and functionality of the instructions and/or program modules may be distributed or combined in various examples as needed. And firmware or hardware equivalents such as integrated circuits, field programmable gate arrays (FPGAs), and the like in part or in whole may provide the features and functionality. Various data structures may be used to more effectively implement one or more aspects of the disclosure, and such data structures are contemplated to be within the scope of the executable instructions and computer-usable data described herein.

Also the devices, which can be wireless devices, discussed herein may be configured as transmitters, receivers or transceivers for sending data to each other or network and in one example may be integrated with microphones, cameras, recording devices, smart phones, mixers, controllers, tablets, laptops, desktops, notebooks, and other computing devices, etc, individually or separately as desired. The devices discussed herein may also include various software and/or hardware components to accomplish this functionality as discussed herein.

Further each of the devices discussed herein can include, embody, employ, or utilize any type of computer, server, or data processing device. For example, each device may include a processor controlling overall operation of the device and may further include RAM, ROM, an antenna, network interface, memory, and input/output interfaces. The input/output interfaces may include one or more of a microphone, camera, scanner, speaker, display screen (e.g., touchscreen), keypad, keyboard, and other electronic components found in computing devices. The devices may include a variety of interface units and drives for reading, writing, displaying, and/or printing data or files. Each memory may further store operating system software for controlling overall operation of the wireless device, control logic for instructing the wireless device to perform aspects as described herein, and other application software providing secondary, support, and/or other functionality which may or may not be used in conjunction with one or more aspects described herein. Functionality of the software may refer to operations or decisions made automatically based on rules coded into the control logic, made manually by a user providing input into the system, and/or a combination of automatic processing based on user input (e.g., queries, data updates, or the like). Each memory associated with the wireless device may also store data used in performance of one or more aspects and may include multiple databases. That is, the information can be stored in a single database, or separated into different logical, virtual (cloud based), or physical databases, depending on system design. The functionality of wireless devices as described herein may be spread across multiple data processing devices, for example, to distribute processing load across multiple computers, to segregate transactions based on geographic location, user access level, quality of service (QoS), or the like. It is contemplated that any of the components of the wireless devices be hard wired or wirelessly linked together.

For purposes of this disclosure, it is contemplated that various types of a hardware can be implemented as or converted into transceivers, receivers, microphones, cameras, recording devices, smart phones, mixers, controllers, tablets, laptops, and other computing devices to execute the functionality discussed herein. For example, a hardware transceiver or receiver, e.g., a USB "dongle" or cabled transceiver may be used to plug into such devices to achieve desired technology. In one example, a hardware transceiver or receiver can be connected to one of the devices discussed herein to allow for other kinds of transmission protocols to be used within the system. For example, a radio dongle could be a transceiver such as a DECT radio, UHF/VHF band radio, etc. This may enable the platform to expand coverage to include additional radio types or transmission protocols. In one example, a USB based DECT transceiver/receiver may collect audio streams from a DECT transceiver/receiver and aggregates and relays the audio data via a USB/Lightning port to a smart phone or other mobile device. Yet again such hardware can be converted into transceivers, receivers, microphones, cameras, recording devices, smart phones, mixers, controllers, tablets, laptops, and other computing devices to execute the functionality discussed herein by various software and/or hardware components to accomplish such functionality.

It is also contemplated that the system can use synchronization, for video and/or audio recording applications including multi-track audio and/or video. This can be accomplished in one example by including a PLL circuit in all of the transmitters, e.g., LAV or Bluetooth microphones, that allows the system to modify their clocks. In one example, a master transceiver, e.g. microphone, can communicate with each transmitter, i.e., slave transmitter, and determines the clock phase offset differences for each slave transmitter. Then the master transceiver will issue commands to each slave transmitter instructing each how to modify their individual clocks using the PLL circuitry—thereby aligning all clocks with the master clock. In one example, if no network uplink, e.g., 5G or WiFi, is present then the master transceiver carries the Grand Master Clock. Yet, if a network, e.g., 5G or WiFi, is connected for uplink then the master transceiver can synchronize its clock to the network clock using a precision time protocol, such as TimeSync® 802.1AS or future standard network synchronization method.

It is contemplated that the devices, which can be wireless, may form various network nodes and can form various network nodes and may be interconnected to each other and to other devices by way of private intranets, corporate networks, LANs, wireless networks, personal networks (PAN), and other networks may also be used. Wireless devices may be interconnected to each other and to other devices via a wide area network (WAN), such as the Internet. It is also contemplated that the formed network may be replaced with fewer or additional computer networks. Moreover, it is contemplated that a local area network (LAN) may have one or more of any known LAN topology and may use one or more of a variety of different protocols, such as Ethernet. It is also contemplated that the devices discussed herein and other devices (not shown) can be connected to one or more of the networks via twisted pair wires, coaxial cable, fiber optics, radio waves or other communication media. For example, the above connections can be made via the internet, WiMAX, LTE, Bluetooth, GSM, 3G, 4G, 5G, Zigbee, 60 GHz, Bluetooth Broadcast, Wi-Fi (e.g., compatible with IEEE 802.11a/b/g/and the like wireless communication standards), infrared, NFC, protocols, etc., or any other known method of wireless transmission. Unless otherwise specified, "transmit," "retransmit," "broadcast," "receive," "communicate," "uplink," "link," "connect," etc. and any such derivations, may be accomplished by the above modes of wireless transmission and any other modes of wireless transmission discussed herein. Moreover, unless otherwise specified, "broadcast" can include but is not limited to a "local broadcast" using Bluetooth or WiFi, for example, and "remote broadcasting," such as streaming to a network, e.g., the world wide web, for example by using IP multicast to many viewers/listeners at distant or remote locations. It is also contemplated that "broadcast" includes both "multicast" or streaming to multiple location but also streaming to single locations using "unicast."

Other known techniques may be used to allow devices to connect with a network. The devices can be enabled to communicate with wireless access points which in one example can be a series of cellular towers hosted by a service provider. "Network" refers not only to systems in which remote storage devices are coupled together via one or more communication paths, but also to stand-alone devices and components that may be coupled, from time to time, to such systems that have storage capability. And "network" includes not only a "physical network" but also a "content network," which is comprised of the data that can in certain instances be associated with a certain entity and can reside across all physical networks.

Figure 1:
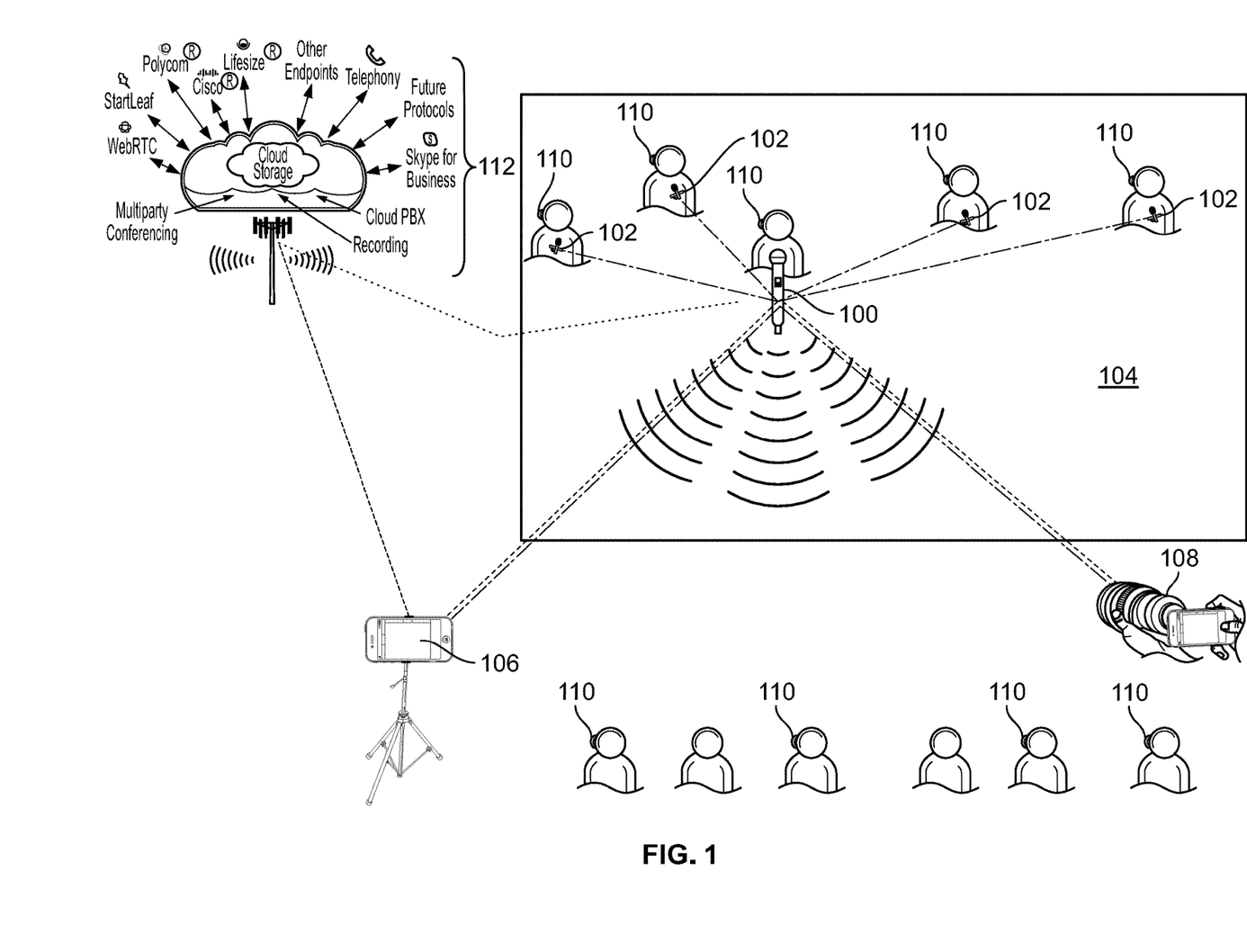
FIG. 1 illustrates a schematic of an exemplary wireless system in accordance with an aspect of the disclosure.

FIG. 1 depicts a schematic of an example wireless system in accordance with one aspect of the disclosure. As shown in FIG. 1, a master transceiver 100 can be a wireless device or a primary/first wireless device. As shown in FIG. 1, a master transceiver 100, can be configured to receive and transmit data from an array of wireless devices 102, 106, 108, 110. In this example, the master transceiver 100 can act as a hub and can be used for collecting data streams from all devices 102, 106, 108, and 110 and can route the data collected from devices 102, 106, 108, and 110 in the system. In one example, the master transceiver 100 can be configured to broadcast the collected data from devices 102, 106, 108, and 110. Yet it is contemplated that any of the devices 102, 106, 108, 110 can act as a master transceiver hub and can include data collection and broadcasting capabilities. The transmission protocols between the devices and the master transceiver 100 may include WiMAX, LTE, Bluetooth, GSM, 3G, 4G, 5G, Zigbee, 60 GHz, Bluetooth Broadcast, Wi-Fi, infrared, NFC, protocols, and other protocols as discussed herein.

The master transceiver 100 can be wireless and may include a microphone and one or more hardware components as discussed herein e.g. antenna, computing device, etc. and software components for providing the exemplary functionality discussed herein. In this example, the first device or master transceiver 100 may be utilized by a first performer or lead performer on stage 104 for collecting sound from the first performer. Additionally, one or more wireless devices or a first plurality of devices 102 in accordance with the description herein e.g., antenna, computing device, software components etc. may also be included in the wireless system of FIG. 1 to provide the exemplary functionality discussed herein. In this example, the first plurality of devices 102 may include lavalier microphones that can be worn by the performers on a stage 104 and can be used for collecting sound from the performers associated with the devices 102.

In this example, a transceiver device 108 in accordance with the description herein, may be positioned off stage 104. The transceiver device 108 may, in this example, include a camera with a specialized zoom lens for capturing or transmitting video and/or still imagery and is located off stage for recording a performance. It is also contemplated that the transceiver device 108 can include a microphone for capturing or transmitting audio. In this example, the transceiver device 108 can be configured to be integrated with or to plug into smartphones, tablets, laptops or other computing devices in accordance with the description herein. Similarly, device 106 can be located off stage and may have similar features and functionality as device 108. Device 106 can include a camera and/or microphone for capturing or transmitting a live performance. Together the devices 106 and 108 can form a second plurality of devices and may include one or more components as discussed herein, e.g., antenna, computing device, etc. for providing the exemplary functionality discussed herein. And at least one of the devices 106, 108 can receive transmissions of the performance from the master transceiver 100 when desired. It is also contemplated that more or less devices in accordance with the description herein can be positioned off stage to accomplish the desired mix, broadcast, transmission, retransmission, recording, etc.

Additionally, audience members can be provided with listening and/or display devices 110 to receive a broadcast of the performance. The devices 110 can include a speaker for outputting the audio of the performance, may be wireless, and may include one or more hardware components as discussed herein, e.g., antenna, computing device, etc. and software components for providing the exemplary functionality discussed herein. The listening devices 110 can be configured to receive a transmission from the master transceiver 108, which can be a particular mix of audio from each of the devices 100, 102, 106, 108 in the system. It is also contemplated that the listening devices 110 can also incorporate a display such that imagery and/or video can be viewed by the audience members. In another example, the display and or speaker can be connected to, integrated with or a part of a smartphone, tablet, laptop or other computing device. And in certain examples, the listening devices 110 can also include microphones for communicating with the performers. It is also contemplated that the performers are provided with listening devices 110, which have similar capabilities as the audience member listening devices, and the performers can receive a broadcast or selected mix of the performance.

In this example, the first plurality of wireless devices 102 through their respective plurality of microphones are configured to convert sound waves from a first plurality of performers or sources into a first plurality of signals. And the first plurality of wireless devices 102 can be configured to transmit the first plurality of signals over a first wireless protocol to the master transceiver 100. The master transceiver 100 can be configured to combine a plurality of signals from the first plurality of wireless devices 102 and a master signal from a performer associated with the master transceiver 100 into a combined signal of all of the sources on stage 104. The master transceiver 100 can be configured to broadcast the combined signal over the first wireless protocol and a second wireless protocol from all of the sources on stage 104 simultaneously with the transmission over the first wireless protocol. And in this example, the first protocol may be a Bluetooth transmission protocol and the second protocol may be a Wi-Fi protocol.

In this example, the second plurality of wireless devices 106, 108, positioned off stage, can be configured to receive the combined signal from the master transceiver 100. Also one or more cameras associated with the second plurality of wireless devices 106, 108 may be configured to capture images or video feeds of the performers on stage 104. And, in this example, one or more of the second plurality of wireless devices 106, 108 may be configured to transmit the combined signal with or without images and/or video feeds over a third wireless protocol, which in one example can be a 5G protocol, to network 112 for recording to cloud storage, further broadcasting, conferencing (multiparty), future playback, telephony, transferring data, etc. The network 112 may also connect to various types of conferencing and/or broadcasting software, such as, Cloud PBX, Skype for Business, Lifesize®, Cisco®, Polycom®, StarLeaf, WebRTC, etc. and other endpoints and future protocols.

Also the second plurality of wireless devices 106, 108 can be configured to transmit the images or video feeds to the master transceiver 100 over the first protocol, which in this example is Bluetooth broadcast, and a second protocol simultaneously with the first protocol to the master transceiver 100. And, in this example, the second protocol can be Wi-Fi. The master transceiver 100 can then aggregate the images and video feeds along with the audio feeds and sent to the network 112 by way of 5G and/or WiFi in the form of video and audio packets. Alternatively or in addition, the master transceiver 100 can store the images and video feeds with or without audio collected from the wireless devices 106, 108. Routing all of the signals through the master transceiver 100 may help to obtain multiple video and audio sources from different vantage points throughout the venue or performance and utilize a single unified IP transport protocol to receive all of the materials collected from the various devices. In another example, an additional wireless device may be configured to collect and aggregate the disparate video and/or audio feeds. And this additional wireless device can utilize custom software processing to align the various feeds.

In another example, the second plurality of wireless devices 106, 108 can transmit the signal of images or video feeds of the performers on stage 104 over a third transfer protocol directly to network 112. For example, one of the wireless devices 106, 108 can send combined video and/or audio packets to network 112. Or one of the wireless devices 106, 108 can send a respective video and/or audio feed from a single vantage point. It is contemplated that the system may also utilize video synchronization across multiple devices, such as cameras, microphones, etc. as part of the transfer protocol.

Also the second plurality of wireless devices 106, 108 can be configured to transmit data, e.g., audio or video data, to each other. The second plurality of wireless devices 106, 108 may also transfer a combined signal of the images and/or video feeds collected along with the mix received from the master transceiver 100 directly to network 112 over the third transfer protocol. In one example, the third transfer protocol can be a 5G protocol.

It is also contemplated that any one of devices 100, 102, 106, 108, and 110 may include a connection or an uplink for delivering the performance to a network 112 over a wireless transfer protocol as discussed herein. For example, the master transceiver 100 can transmit a combined mix of feeds from the sources associated with the master transceiver 100, the first plurality of devices 102, and the second plurality of devices 106, 108 to the network 112 over the third transfer protocol directly to network 112. For example, master transceiver 100 can be provided with an uplink, which can be a 5G uplink or connection in one example, along with Wi-Fi or Bluetooth redundancy described previously for disseminating the combined mix above.

For example, the master transceiver 100 can utilize redundancy, e.g. Wi-Fi or BLE redundancy, to simultaneously stream audio to wireless devices 102, 106, 108, which are local mobile devices at the performance, for recording or conferencing purposes. And the master transceiver 100 may also be configured with 5G capabilities so that it can also route audio and/or video of the performance directly to the mobile network 112 to stream to other live audiences that are located remotely outside of the venue. In this example, the master transceiver 100 may itself serve as a conference bridge for disparate routing paths to the 5G network and for broadcasting to the audience. So, for example, the master transceiver 100 itself may stream data, such as audio or video, over a 5G network as its primary link while simultaneously streaming data, such as audio or video, over local BLE and/or WiFi for local usage (Broadcast, conferencing etc.), where the local BLE and WiFi may provide backup routes. It is also contemplated that data, e.g., audio or video, may be routed bi-directionally to BLE or WiFi devices or microphones, e.g. second plurality of wireless devices 106, 108, where the master transceiver 100 serves as an onramp to the 5G network. In another arrangement any devices 100, 102, 106, 108, and 110, such as device 106, can act as an onramp to the network 112 as discussed herein. And other transmission protocol uplinks to the network 112 for either the master transceiver 100 or any devices 102, 106, 108, and 110 are also contemplated as discussed herein, such as LTE protocols, 5G, 4G, and 3G.

Additionally, both wireless devices 106 and 108 may include memory storage, for example, in accordance with one or more aspects discussed herein. And both devices 106, 108 may be provided with software, such as a video and/or audio recording application that has multi-track audio and/or video synchronization as is discussed herein. This software can be configured to align the various feeds from devices 100, 102, 106, 108, 110 in order to ensure that the video and/or audio feeds are in alignment before transmission. It is contemplated that any one or more of the wireless devices 100, 102, 106, 108, 110 can be provided with the necessary hardware and software as discussed herein for audio and/or video recording and multi-track synchronization.

It is further contemplated that through wireless devices 110, audience members can provide content to the performance as a performer, ask questions or provide comments directly into the performance to be broadcasted or to the individual performers through a talkback feature. This example may be specific to conference applications and other a two-way transmission schemes. Example potential use cases are large classrooms, audience members having hearing disabilities, more focused messaging or mixes for particular users, such as airports where users only want to hear information about their flight, situations and/or environments where PA systems are not reliable, or large venue performances where the use of PA systems is difficult and the stage becomes hard to see. Yet other uses are also contemplated.

In another example or in conjunction with other examples discussed herein, video and/or audio may be routed from one or more distant networks to the master device 100 as required for the performance. For example, a distant network can be rendered locally, e.g., video projection on a large or personalized screen or audio on the sound reinforcement main speakers, etc. to the audience. In this example, audio can be routed out through the master transceiver 100 to one or more listening devices 110 by way of Bluetooth Broadcasting or any other protocols mentioned herein. In this example, the master transceiver 100 can act as a conference bridge for all protocols.

Although the performers in the example described in relation to in FIG. 1 are located on a stage, because of the wireless nature of the system, the system shown and described in relation to FIG. 1 can have several mobile and non-mobile applications. For example, each of the devices 100, 102, 106, 108, 110 are only tethered through wireless links. It is contemplated that the system described in relation to FIG. 1 can have mobile journalist applications and the like and be used on site at a live event such as a performance, athletic event, war zone, etc., for broadcasting the event. Also in this example, the wireless links may also be used to provide interrupted feedback from a remote producer or director.

Figure 2:
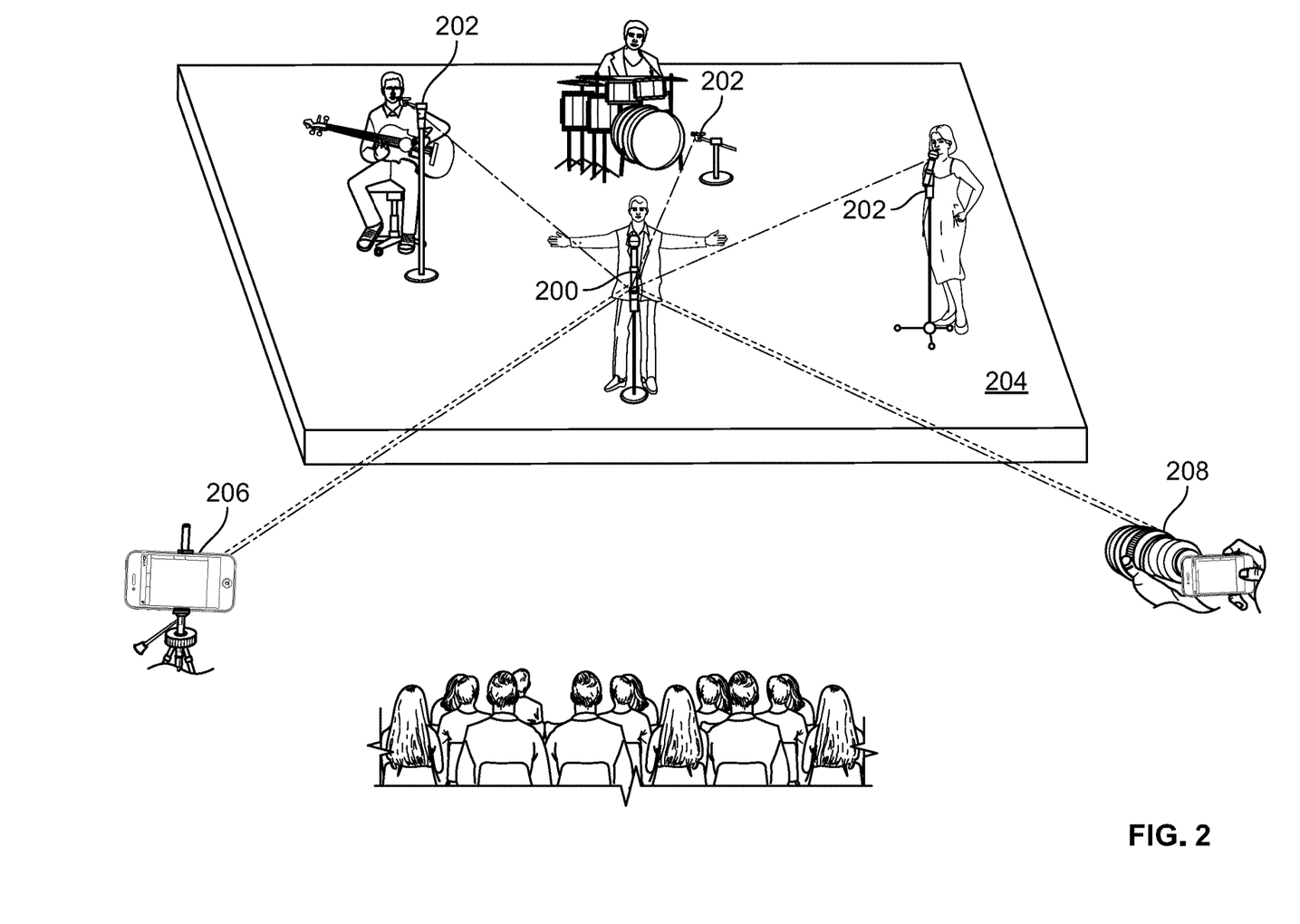
FIG. 2 illustrates a schematic of another exemplary wireless system in accordance with an aspect of the disclosure.

FIG. 2 illustrates another schematic, which is similar to the example shown and described in relation to FIG. 1 where similar reference numerals represent similar components with similar functionality. Yet FIG. 2 illustrates a live recording example. Like in the above example, a master transceiver 200 can be provided to receive signals from one or more of a first plurality of wireless devices 202 and one or more of a second plurality of devices 206, 208. The master transceiver 200 may also include a microphone configured to convert sound waves to a signal for transmitting and can be associated with a lead performer, e.g., a lead vocalist in this example. Also, the first plurality of wireless devices 202 can each include a microphone and can each be associated with other performers, for example, guitarists, vocalists, percussionists, other instrumentalists, and the like.

In this example, the performance may be recorded by the second plurality of devices 206, 208. Again the master transceiver 200 can receive inputs from the first plurality of devices 202, which in this example can be audio feeds, and the master transceiver 200 can output a combined feed of signals from the master transceiver 200 itself along with the inputs from the first plurality of devices 202. Again in this example, the master transceiver 200 may transmit the combined feed to one or both of the second plurality of devices 206, 208 by transmitting over two different communication protocols to establish redundancy and ensure that none of the transmission is dropped for recording purposes. In one example, the two different communication protocols can be Bluetooth and Wi-Fi. Again in this example, both devices 206 and 208 may include software, such as a video recording application that has multi-track audio synchronization. This software can be configured to align the various feeds from devices 200, 202, 206, and 208 in order to ensure that the video and audio feeds are in alignment before transmission.

It is also contemplated that local and external networks can be associated with any one of the wireless devices 200, 202, 206, and 208 for streaming content of the performance locally or remotely to external audiences or users using the techniques discussed herein. It is also contemplated that any one of the wireless devices 200, 202, 206, 208 be a master transceiver device and any one of the wireless devices be configured with memory to record any aspects of the performance. It is also contemplated that the performance be transmitted in real time during the performance or after the fact by streaming the recording stored in one or more memory devices associated with the wireless devices 200, 202, 206, or 208.

Figure 3:
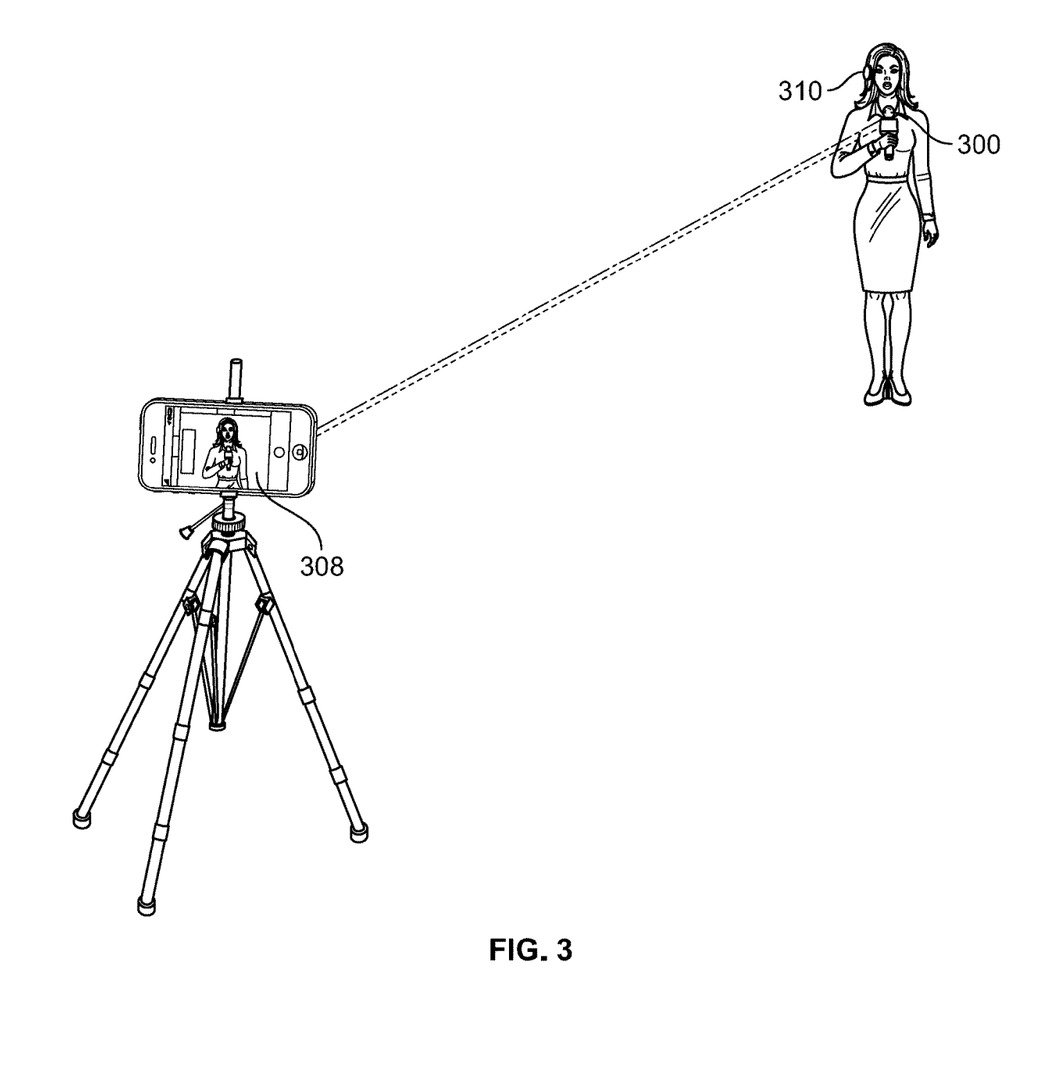
FIG. 3 illustrates yet another a schematic of an exemplary wireless system in accordance with an aspect of the disclosure.

FIG. 3 shows another schematic, which is similar to the examples shown and described in relation to FIGS. 1 and 2 where similar reference numerals represent similar components with similar functionality. FIG. 3 illustrates another live recording example, which may be deployed in a mobile journalist application. Like in the above examples, a master transceiver 300 can be provided and may also include a microphone configured to convert sound waves to a signal for transmitting and can be associated with a performer, e.g., a journalist in this example.

In this example, the performance of the journalist may be recorded by a second wireless device 308. Again, the master transceiver 300 can receive inputs from any sources, which in this example can be audio or video feeds. Also as in all of the examples discussed herein, the master transceiver 300 and the second wireless device 308 can communicate bidirectionally. The master transceiver 300 can output a signal from the associated microphone and/or a combined feed of signals from any desired inputs. Again, in this example, the master transceiver 300 may transmit the combined feed to the second wireless device 308 by transmitting over two or more different communication protocols to establish redundancy and ensure that none of the transmission is dropped for recording purposes. In one example, the two different communication protocols can be Bluetooth and Wi-Fi. Again, in this example, the second device 308 may include software, such as a video and/or audio recording application that has multi-track audio and/or video synchronization. This software can be configured to align the various feeds from any wireless device in order to ensure that the video and audio feeds are in alignment before transmission.

It is also contemplated that local and external networks can be associated with any one of the wireless devices 300, 308 for streaming content of the performance locally or remotely to external audiences or users using the techniques discussed herein. It is also contemplated that any one of the wireless devices 300, 308 be a master transceiver device and any one of the wireless devices be configured with memory to record any aspects of the performance. It is also contemplated that the performance be transmitted in real time during the performance or after the fact by streaming the recording stored in one or more memory devices associated with the wireless devices 300 or 308.

Also in this example, the performer or journalist can be provided with a listening device 310 configured for communication with local or distant feeds. Also through the bidirectional nature, "talkback" or "IFB" (Interruptible foldback) features can be included. In this case, talkback or IFB audio can sourced from a distant feed like a control room producer, anchor, etc., receiving cues, feedback, or directions from the control room, etc.

Figure 4:
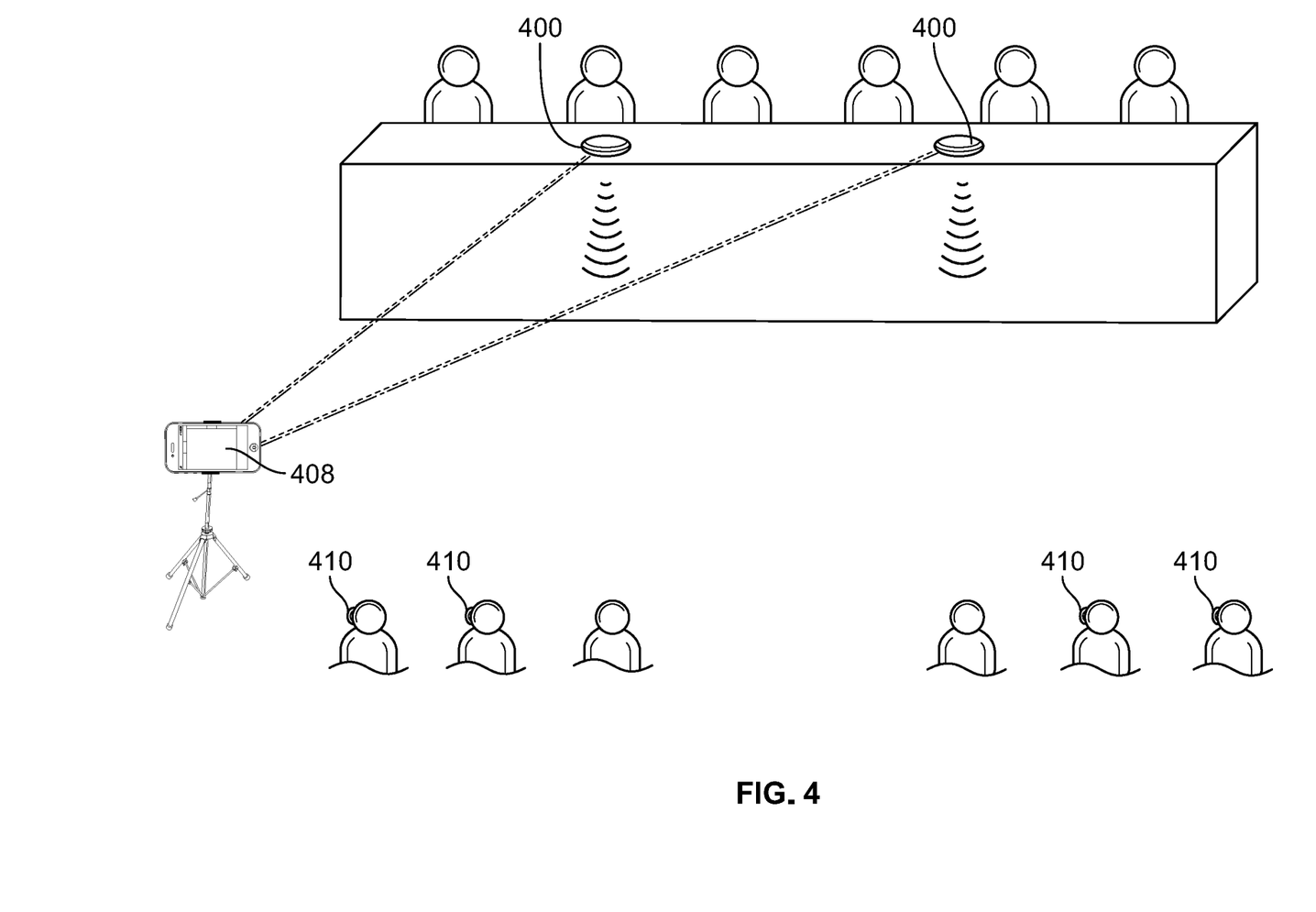
FIG. 4 illustrates yet another a schematic of an exemplary wireless system in accordance with an aspect of the disclosure.

FIG. 4 illustrates another schematic, which is similar to the examples shown and described in relation to FIGS. 1-3 where similar reference numerals represent similar components with similar functionality. FIG. 4 illustrates wireless speaker array example. In this example, one or more transceivers 400 that can be associated with separate microphones can be implemented. In this example, the associated microphones 400 can be configured to receive sound from one or more presenters and can convert the sound received from the presenters into one or more signals for broadcasting to an audience. In this example, the transceivers 400 can be configured to transmit signals to a second wireless device 408 and to listening devices 410 associated with audience listeners or broadcast listeners. Similar to the above examples, the one or more transceivers 400 can be configured to broadcast the combined signal over a first wireless protocol and a second wireless protocol simultaneously with the transmission over the first wireless protocol. And in this example, the first protocol may be a Bluetooth transmission protocol and the second protocol may be a Wi-Fi protocol.

The transmission over the two different protocols may also assist in recording the presentation by the second device 408. Again transmitting over two different communication protocols can help to establish redundancy and ensure that none of the transmission is dropped for recording purposes. Again in this example, the second wireless device 408 may include software, such as an audio and/or video recording application that has multi-track audio and/or video synchronization. This software can be configured to align the various feeds from multiple devices in order to ensure that the video and audio feeds are in alignment before recording and or other transmission.

Like in the above examples, it is also contemplated that second device 408 may include a camera and/or microphone for capturing or transmitting a live performance of the presenters. The transceivers 400 and/or second device 408 may also receive inputs from various of devices, which may include various audio and/or video feeds. The transceivers 400 can output a combined feed of signals from the transceivers themselves along with the inputs from various devices. Likewise the second device 408 can output a combined feed from the transceivers and any other devices connected to the system shown in FIG. 4. For example, second device 408 can be implemented for video forwarding. This can be utilized in a video/audio conference at a local system and can be forwarded to another distant system where the video and audio feeds may be transmitted. This, in certain examples, can be compatible with standard CODECs used with services like Skype, Zoom, etc.

It is also contemplated that local and external networks can be associated with any one of the wireless devices 400 and 408 for streaming content of the performance locally or remotely to external audiences or users using the techniques discussed herein. It is also contemplated that any one of the wireless devices 400 and 408 be a master transceiver device and any one of the wireless devices be configured with memory to record any aspects of the performance. It is also contemplated that the performance be transmitted in real time during the performance or after the fact by streaming the recording stored in one or more memory devices associated with the wireless devices 400 and 408.

As discussed, one or more of the transmission links between the wireless devices discussed herein e.g. 100, 102, 106, 108, 110, 200, 202, 206, 208, 300, 308, 400, 408, 411, can include diverse transmission protocols, including any of the transmission protocols discussed above. And the wireless devices can transmit and receive data over multiple transmission protocols simultaneously as discussed herein. In accordance with the above, WiFi and Bluetooth radios are complimentarily deployed together using frequency and time diversity techniques to better guarantee data transfer robustness. And the same data may be sent simultaneously over a mobile devices data network (3G, 4G, 5G, . . . ) helping to maximize redundancy.

In specific examples, the system may utilize both WiFi and Bluetooth simultaneously over one or more transmission links. And this can apply to one or more of the examples discussed herein. For example, one or more transceivers may implement "Bluetooth Broadcast", which is a form of Bluetooth that enables a single transmitter to be received by a large number of local Bluetooth receivers. Yet Bluetooth Broadcast includes a "best-effort delivery" protocol meaning that it does not perform retransmissions if audio packets are lost. So, for example, if any wireless devices attempt to record the Bluetooth broadcast or BLE broadcast streams, they may be susceptible to packet loss, which may not be ideal when attempting to record data. But Wi-Fi, for instance, can be used as a backup link when recording such broadcast streams should certain packet loss occur. So even though a low latency BLE broadcast stream may have transmission errors by using a Wi-Fi backup link, all of the data can be received and the reliability of the systems may improve.

In another example, a backup transmission link can be used when certain conditions occur. For example, a Bluetooth audio streaming RF link may experience heavy spectral interference or multi-path fading. In reaction to detecting such a condition, additional connections may be established by the same devices using the same data to be simultaneously transmitted over additional transports. For example, a WiFi link may be established in another RF band (not 2.4G) and captured by the same sink device using the redundant links. In one example, diversity transmission spreads out the data over multiple bands and redundancy allows the receiver to multiplex between sources to recover missing or corrupted data appearing on one of the links. In another example, a low power mode within the diversity algorithm can be used to force the return to usage of the lower power radio type (Bluetooth Low Energy or other) during conditions when spectral conditions are favorable for the lower power link.

In relation to the examples described in relation to FIGS. 2-5, it is also contemplated that any of the devices could be mounted on a mobile device such as a drone or robot to render, transmit, receive, etc. such a mobile performance. For example, it is contemplated that a "receiver drone" or "receiver robot" could be positioned at a strategic position above a wide area microphone network. These receivers may be configured to take video and aggregate disparate on-the-ground audio/video feeds and finally provide a real-time bridge/uplink to a 5G or other satellite based network. The line-of site without obstruction nature of a drone hovering over a large area can provide a useful receiver/aggregator position that may improve the reception of multiple devices. Example use cases include mobile journalist and videography (outside weddings), conferences in large halls etc. It is also contemplated that multiple slave drone camera, microphone, transmitter, receiver, and/or transceiver (arrays) may be deployed as components within a larger system that allows positional audio/video capture dynamically adjustment. Adaptable microphone and camera positions may be advantageous to enable reconfiguration for different "scenes" or changing conditions on-the-ground such as in a war zone or other mobile journalist contexts.

Figure 5:
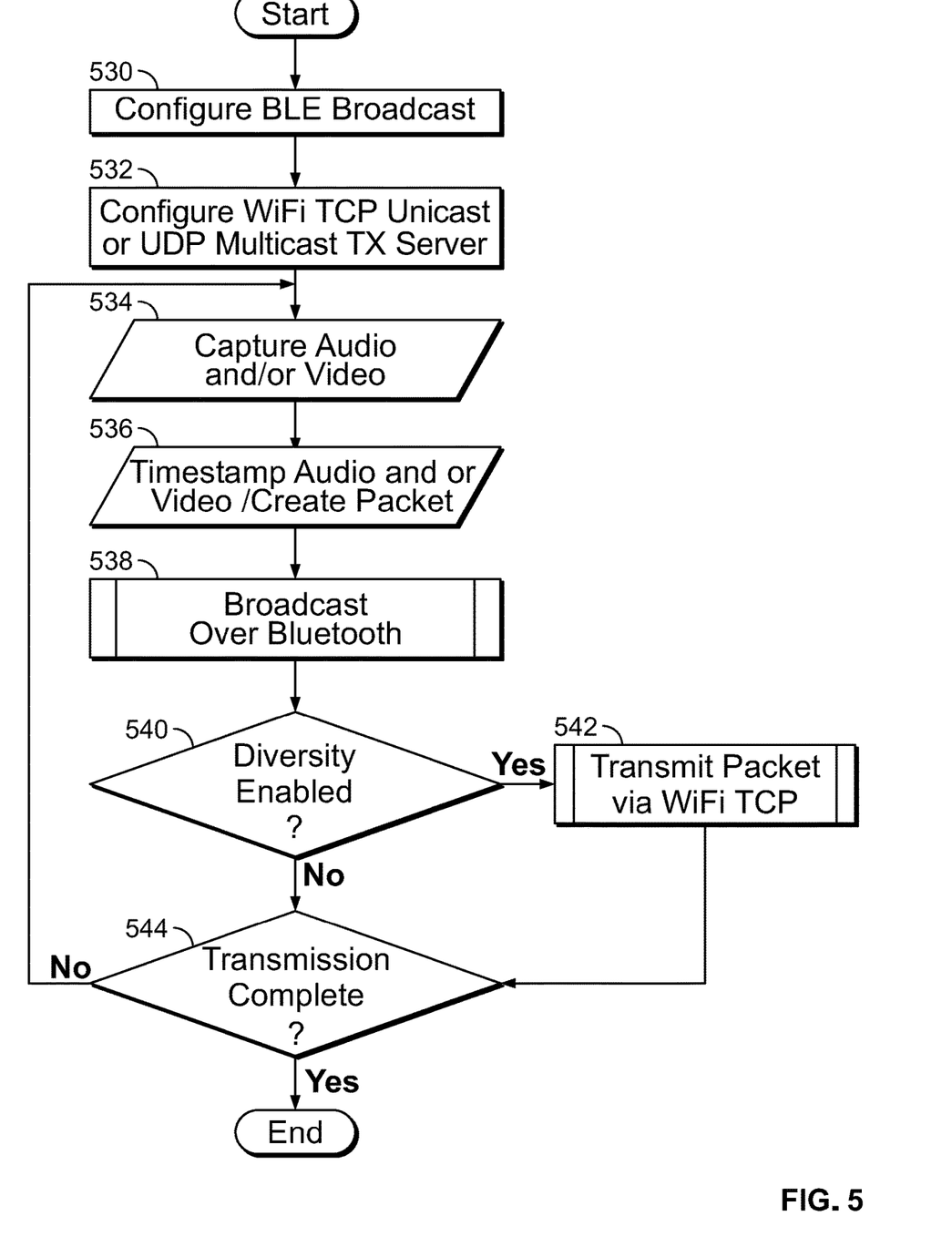
FIG. 5 illustrates a schematic of an exemplary transmission method in accordance with an aspect of the disclosure.

FIG. 5 illustrates an exemplary transmitter diversity process flowchart which implements BLE Broadcast and WiFi (TCP/UDP) but could apply to other wireless transmission protocols as well. Such transmission process can be utilized by the systems and methods described above in relation to FIGS. 1 to 4 for data, such as audio and/or video data. First at step 530 the BLE broadcast and the Wi-Fi TCP unicast/UPD multicast TX server can be configured at a transmitter or any of the devices discussed herein at step 532. Next audio and/or video data can be captured by one or more devices as discussed herein at step 534. The audio and/or video data can then given a timestamp and a packet is created at step 536. The packet can then be broadcasted over a suitable transmission protocol, for example, BLE Bluetooth in the case of audio and WiFi, 5G, or others that have high enough throughput capacity in the case of the video, at step 538 in this example. If diversity transmission is enabled as detected at step 540, the packet may also be transmitted via Wi-Fi TCP at step 542, and the system may continue to capture audio and/or video until the transmission is complete and the process ends. If diversity transmission is not enabled, then the system may determine whether the transmission is complete at step 544 and may continue to capture audio and or video until the transmission is complete and the process ends. It is contemplated that a similar flow process could be used with other transmission protocols. Also more than two transmission protocols could also be used for diversity transmission in accordance with the processes discussed herein.

Figure 6:
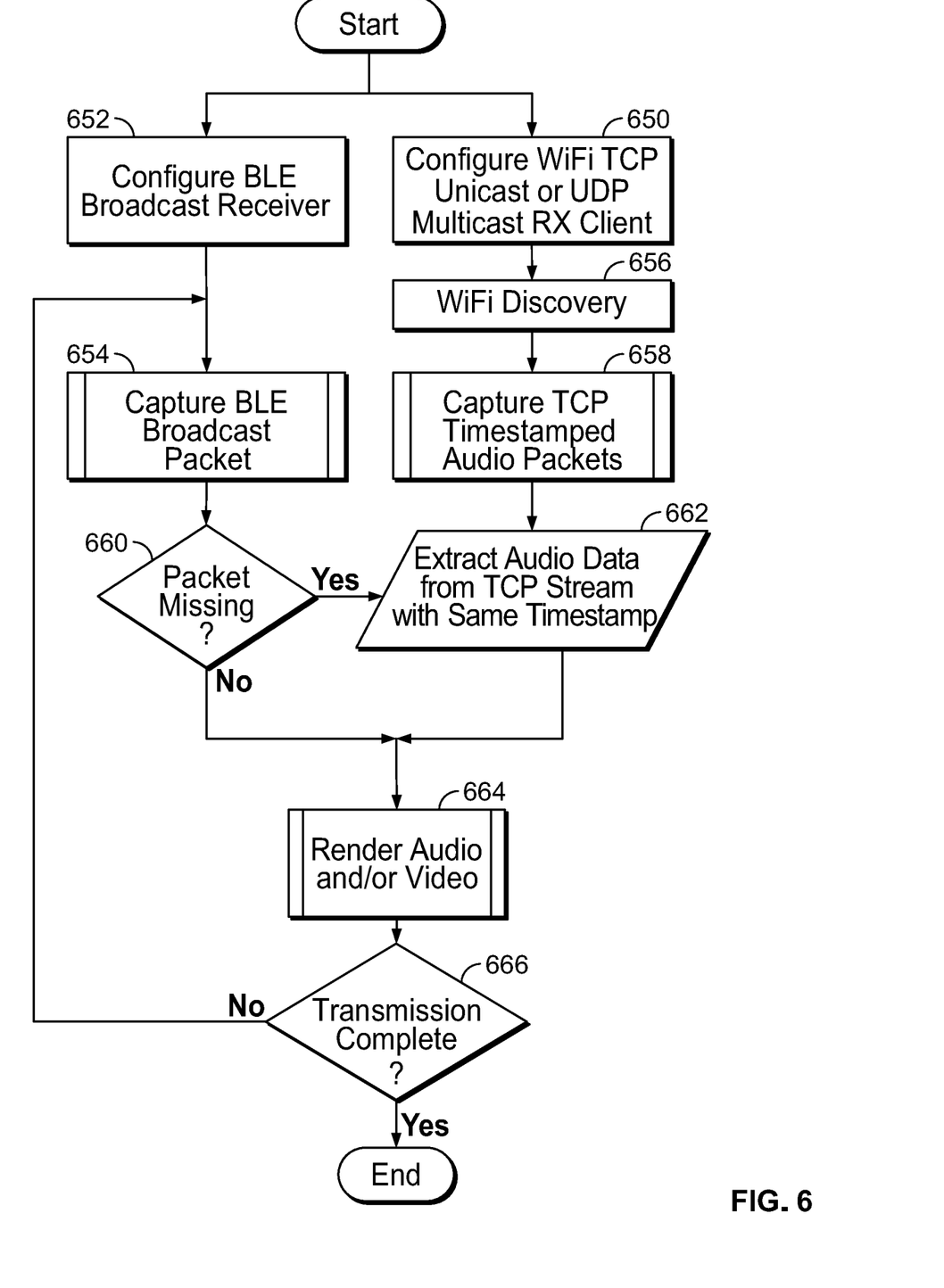
FIG. 6 illustrates a schematic of another an exemplary receiving method in accordance with an aspect of the disclosure.

FIG. 6 depicts an exemplary receiver diversity flow process that can be utilized by the systems and methods described above in relation to FIGS. 1 to 5 for data, such as audio and/or video data. In this example, data is received over both the BLE broadcast and Wi-Fi protocols but could apply to other wireless transmission protocols as well. First the BLE broadcast receiver can be configured at step 652 and at the same time the Wi-Fi TCP unicast or UDP multicast RX client can be configured at step 650. Next a BLE broadcast packet can be received by the receiver at step 654. And at the same time Wi-Fi discovery may occur at the receiver at step 656. The receiver also captures TCP timestamped audio packets at step 658. The receiver can also determine whether the packet is missing from the BLE transmission at step 660. And if the packet is not missing then the receiver may render the audio and/or video at step 664. But if the packet is missing, the receiver may then rely on the Wi-Fi transmission by extracting audio and/or video data from the TCP stream with the same timestamp as the lost packet at step 662. One the lost audio and/or video data is extracted from the TCP stream, the audio and/or video is then rendered by the receiver again at step 664. As shown in FIG. 6, this loop occurs until the audio transmission is completed at step 666. It is contemplated that a similar flow process could be used with other transmission protocols. Also more than two transmission protocols could also be used for diversity transmission in accordance with the processes discussed herein.

Figure 7:
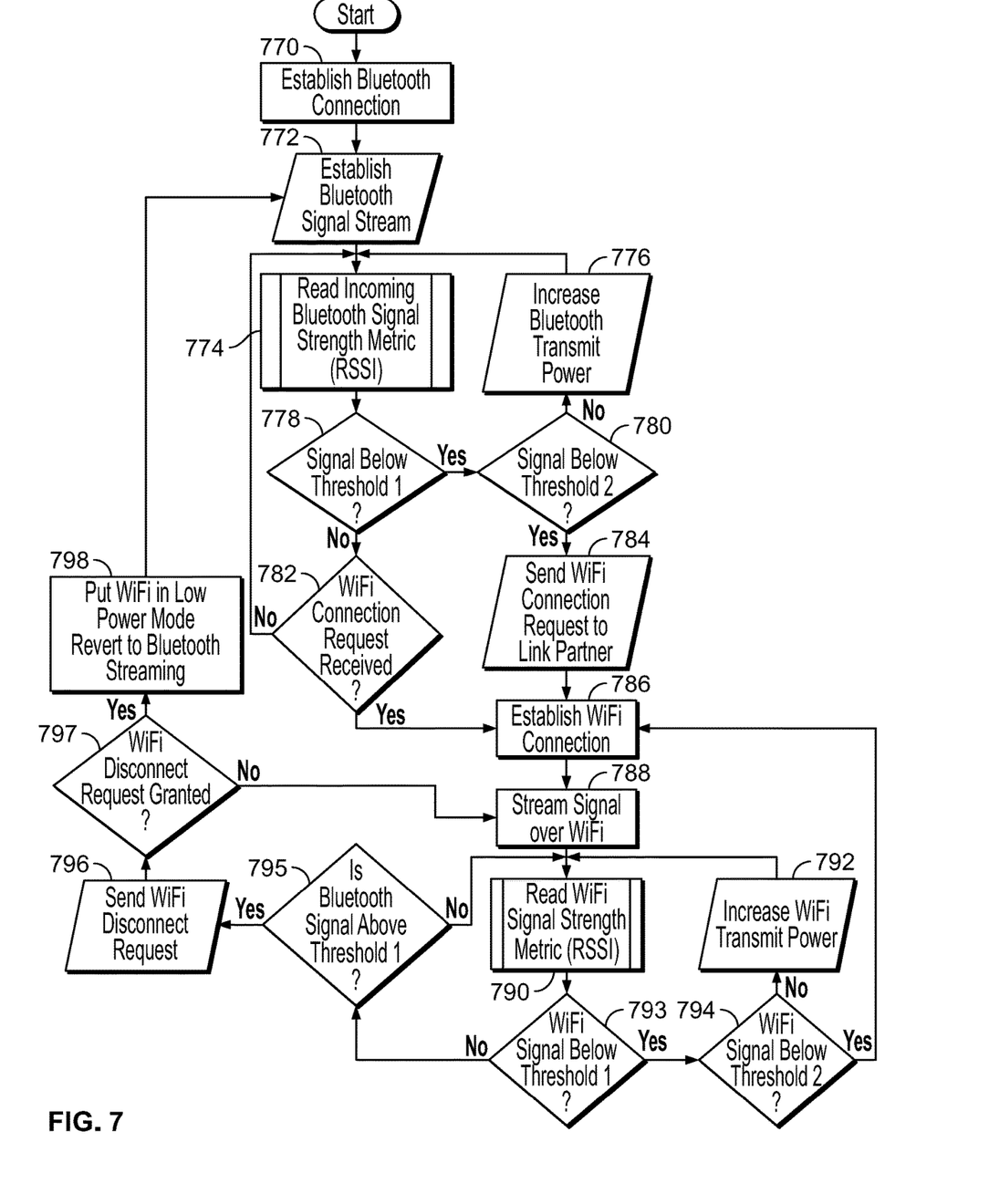
FIG. 7 illustrates an example schematic of a receiver and transmitter power adaptation flowchart of a dynamic backup link deployment.

FIG. 7 shows an example schematic of a receiver and transmitter power adaptation flowchart of a dynamic backup link deployment that can be utilized by the devices, systems and methods described above in relation to FIGS. 1 to 5 for data, such as audio and/or video data. First the system can establish a Bluetooth connection between two or more wireless devices as discussed herein at step 770. Once the Bluetooth signal stream is established at step 772, the receiving device can read the incoming Bluetooth signal's strength using a signal strength metric, for example, through a received signal strength indicator ("RSSI") at step 774. If the signal strength is below a certain predetermined threshold or Bluetooth Threshold 1 at step 778, the receiving device can determine whether the signal is below another certain predetermined threshold or Bluetooth Threshold 2 at step 780. If the signal is not below Threshold 2 then an increase in Bluetooth transmission power is requested at step 776. If the signal strength is not below Bluetooth Threshold 1, then the process can move to step 782 where it is determined whether a Wi-Fi connection has been received.

But if the signal is below Bluetooth Threshold 1 at step 778 and below Bluetooth Threshold 2 at step 780, then a Wi-Fi connection link request is sent to the transmitting device by the receiving device and the transmitting device determines whether a Wi-Fi connection request is received at step 784. And a Wi-Fi connection can be established between the transmitter and the receiver at step 786, and the signal can be streamed over Wi-Fi from the transmitting device to the receiving device at step 788. The receiving device can also monitor the signal strength of the Wi-Fi stream at step 790 and may detect whether the signal is below a certain predetermined threshold, e.g. Wi-Fi Threshold 1 at step 793. If the signal is not below Wi-Fi Threshold 1 then the receiving device may determine whether the Bluetooth signal from the transmitting device is above the Bluetooth Threshold 1 at step 795. If it is determined that the Bluetooth signal from the transmitting device is above the Bluetooth Threshold 1 at step 795, then the receiving device may request that the Wi-Fi connection is disconnected at step 796. And depending on whether this request is granted at step 797, the Wi-Fi can be placed in low power mode and revert to Bluetooth streaming at step 798 or continue to stream the signal over Wi-Fi. Also when the Bluetooth Signal is strong, then the Wi-Fi transmission can be placed into a low power state.

But, if the Wi-Fi signal is below Wi-Fi Threshold 1 at step 793, then the receiving device may also determine whether the signal is below another certain predetermined threshold, Wi-Fi Threshold 2 at step 794. If the Wi-Fi signal is below Wi-Fi Threshold 2 at step 794, then the receiving device may attempt again to establish a Wi-Fi connection at step 786 from the transmitting device. But if the signal is not below Wi-Fi Threshold 2 then the receiving device can request that the Wi-Fi transmission power be increased at the transmitting device at step 792, and the transmitting device can continue to transmit the signal over Wi-Fi. It is contemplated that the above power adaptation configuration discussed in relation to FIG. 7 can be used with more than two transmission protocols and can be used in conjunction with other protocols in addition to Bluetooth and Wi-Fi.

Audio data may be packetized uniquely on each link, and synchronization of those disparate streams may be accomplished using embedded timestamp information within each stream such that the receiving-end sync device may commutate between streams, buffering and aligning them on basis of the timestamp information for recording or real-time rendering.

In one example, multiple microphones may be synchronized using a system PLL and/or sample rate conversion processes to align the audio samples so there is no skew between them. In this case there may be no need for timestamps as all microphones can be self-synchronizing. However, when a backup diversity is required such as when using a different radio, e.g. Wi-Fi, it may become important that timestamps are utilized. In one example, timestamps can be used by receiving devices device to align the different streams received, for example, Bluetooth, Wi-Fi (and other) feeds so that they can be aligned as shown in FIG. 6.

An example system may include a first plurality of wireless devices each having a microphone and a wireless antenna forming a first plurality of microphones and a first plurality of wireless antennas, the first plurality of microphones may be configured to convert sound waves from a first plurality of sources into a first plurality of signals and the first plurality of wireless devices may be configured to transmit the first plurality of signals over a first wireless protocol.

The example system may also include a master transceiver which may have a transceiver microphone and a transceiver wireless antenna. The transceiver microphone can be configured to convert sound waves from a master source into a master signal. The master transceiver may be configured to receive the first plurality of signals from the first plurality of wireless devices over the first protocol. The master transceiver may also be configured to combine the first plurality of signals and the master signal into a combined signal. And the master transceiver may be configured to broadcast the combined signal over the first wireless protocol. The master transceiver can be configured to broadcast the combined signal over a second wireless protocol simultaneously with a transmission of the first wireless protocol.

The example system may also include receiver which can be configured to receive the combined signal from the master transceiver. The receiver can be configured to receive the combined signal over the first wireless protocol. And the combined signal can further include data packets. The receiver can be configured to determine whether each of the data packets of the combined signal have been received and the receiver may determine whether all data packets have been received. And the receiver may be configured to extract data of any packet not received from the second wireless transmission protocol.

The first wireless protocol can be a Bluetooth transmission protocol and the second wireless protocol may be a Wi-Fi protocol. The receiver can be configured to transmit the combined signal over a third protocol to a network. The receiver may include a camera, and the receiver can be configured to capture images of the first plurality of sources and the master source. The receiver can be configured to transmit the images of the first plurality of sources and the master source. The master transceiver may be configured to transmit the combined signal to a network over a third transfer protocol, and the third transfer protocol can be 5G.

In another example a method may include configuring a first microphone to receive sound from a source and converting the sound into a first signal and transmitting the first signal over a first wireless protocol; and configuring a second microphone to convert sound from a second source into a second signal. The second microphone can receive the first signal from the first microphone over the first wireless protocol, and the second microphone may combine the first signal and the first signal into a combined signal. The second microphone may broadcast the combined signal over the first wireless protocol and the second microphone may broadcast the combined signal over a second wireless protocol simultaneously with a transmission of the first wireless protocol. The first wireless protocol can be a Bluetooth transmission protocol and the second wireless protocol may be a Wi-Fi protocol. The method may also include providing a receiver and configuring the receiver to receive the combined signal from the second microphone. And the receiver can configured to receive the combined signal over the first wireless protocol and the combined signal further comprising data packets. The receiver can be configured to determine whether each of the data packets of the combined signal have been received. The receiver may determine whether all data packets have been received. And the receiver can be configured to extract data of any packet not received from the second wireless transmission protocol. The receiver may be configured to transmit the combined signal received from the second microphone over a third wireless protocol to a network, and the third wireless protocol may be 5G. The receiver can be configured to record the combined signal received from the second microphone.

In another example, a first microphone may be configured to receive sound from a source and covert the sound into a first signal and transmit the first signal over a first wireless protocol and over a second wireless protocol simultaneously with the first wireless protocol. The example may also include a receiver configured to receive the first signal from the first microphone. And the receiver may be configured to receive the first signal over the first wireless protocol. The first signal may include data packets, and the receiver may be configured to determine whether each of the data packets of the first signal have been received. The receiver may determine whether all data packets have been received and the receiver may be configured to extract data of any packet not received from the second wireless transmission protocol.

The first wireless protocol can be a Bluetooth transmission protocol and the second wireless protocol can be a Wi-Fi protocol. The receiver may be configured to transmit the first signal received from the first microphone over a third wireless protocol to a network, and the third wireless protocol may be 5G. The receiver may be configured to record the first signal from the first microphone.

In the example, a second microphone may be to convert sound from a second source into a second signal, and the first microphone can be configured to receive the second signal from the second microphone over the second wireless protocol. Also the first microphone can be configured to combine the first signal and the second signal into a combined signal and the first microphone can be configured to broadcast the combined signal over the first wireless protocol. The first microphone can be configured to broadcast the combined signal over a second wireless protocol simultaneously with a transmission of the first wireless protocol. The receiver can also include a camera that is configured to capture video of the source.

An example method may include providing a first plurality of wireless devices each having a microphone and a wireless antenna forming a first plurality of microphones and a first plurality of wireless antennas, configuring the first plurality of microphones to convert sound waves from a first plurality of sources into a first plurality of signals and configuring the first plurality of wireless devices to transmit the first plurality of signals over Bluetooth.

Alternatively or in addition, the example method may also include providing a master transceiver with a first microphone and a first wireless antenna, configuring the first microphone to convert sound waves from a master source into a master signal, configuring the master transceiver to receive the first plurality of signals from the first plurality of wireless devices over Bluetooth, configuring the master transceiver to combine the first plurality of signals and the master signal into a combined signal and configuring the master transceiver to broadcast the combined signal over Bluetooth and configuring the master transceiver to broadcast the combined signal over Wi-Fi simultaneously with the transmission over Bluetooth Alternatively or in addition, the example method may include providing a second plurality of wireless devices each having a wireless antenna to form a second plurality of antennas and configuring at least one of the second plurality of wireless devices to receive the combined signal from the master transceiver and configuring at least one of the second plurality of wireless devices to transmit the combined signal over 5G to a network and providing the second plurality of wireless devices with a camera to form a plurality of cameras and configuring the second plurality of wireless devices to capture images of the first plurality of sources and the master source and wherein the second plurality of wireless devices are configured to transmit the images.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
 in a first plurality of wireless devices each having a microphone and a wireless antenna forming a first plurality of microphones and a first plurality of wireless antennas, configuring the first plurality of microphones to convert sound waves from a first plurality of sources into a first plurality of signals and configuring the first plurality of wireless devices to transmit the first plurality of signals over Bluetooth;

in a master transceiver with a first microphone and a first wireless antenna, configuring the first microphone to convert sound waves from a master source into a master signal, configuring the master transceiver to receive the first plurality of signals from the first plurality of wireless devices over Bluetooth, configuring the master transceiver to combine the first plurality of signals and the master signal into a combined signal of data packets and configuring the master transceiver to broadcast the combined signal over a Bluetooth protocol to form a transmission over Bluetooth and configuring the master transceiver to broadcast the combined signal over a Wi-Fi protocol simultaneously with the transmission over Bluetooth; and in a second plurality of wireless devices each having a wireless antenna to form a second plurality of antennas, configuring at least one of the second plurality of wireless devices to receive the combined signal from the master transceiver, the at least one of the second plurality of wireless devices being configured to determine each of the data packets of the combined signal have been received over the Bluetooth protocol and wherein the at least one of the second plurality of wireless devices determines all data packets have been received and wherein the at least one of the second plurality of wireless devices is configured to extract data of any packet not received from the Wi-Fi protocol and configuring the at least one of the second plurality of wireless devices to transmit the combined signal over fifth generation protocol (5G) to a network and providing the second plurality of wireless devices with a camera to form a plurality of cameras and configuring the second plurality of wireless devices to capture images of the first plurality of sources and the master source and wherein the second plurality of wireless devices are configured to transmit the images.

2. The method of claim 1 further comprising monitoring signal strength of the combined signal transmitted over Bluetooth by the master transceiver.

3. The method of claim 2 further comprising transmitting the combined signal over Wi-Fi when Bluetooth signal strength is below a predetermined threshold.

4. The method of claim 2 further comprising disconnecting the Wi-Fi transmission when Bluetooth signal strength is above a predetermined threshold.

5. The method of claim 1 further comprising configuring the master transceiver to be positioned on a stage.

6. The method of claim 1 further comprising configuring at least one of the second plurality of devices to be positioned off a stage.

7. The method of claim 1 wherein the first plurality of microphones comprise lavalier microphones.

8. The method of claim 1 wherein in a third plurality of devices each having a speaker and a wireless antenna to form a plurality of speakers and a third plurality of wireless antennas, configuring each of the third plurality of devices to receive the combined signal from the master transceiver and output the combined signal to its respective speaker.

9. The method of claim 1 wherein the extracting data of any packet not received from the second wireless protocol is based on a timestamp.

10. The method of claim 1 further comprising determining whether diversity transmission is enabled before broadcasting the combined signal over the Bluetooth and Wi-Fi protocol simultaneously.

11. A method comprising:

in a first plurality of wireless devices each having a microphone and a wireless antenna that form a first plurality of microphones and a first plurality of wireless antennas, configuring the first plurality of microphones to convert sound waves from a first plurality of sources into a first plurality of signals and configuring the first plurality of wireless devices to transmit the first plurality of signals over a first wireless protocol;

in a master transceiver with a first microphone and a first wireless antenna, configuring the first microphone to convert sound waves from a master source into a master signal, configuring the master transceiver to receive the first plurality of signals from the first plurality of wireless devices over a first wireless protocol, configuring the master transceiver to combine the first plurality of signals and the master signal into a combined signal of data packets and configuring the master transceiver to broadcast the combined signal over the first wireless protocol to form a transmission over the first wireless protocol and configuring the master transceiver to broadcast the combined signal over a second wireless protocol simultaneously with the transmission over the first wireless protocol; and in a second plurality of wireless devices each having a wireless antenna to form a second plurality of antennas, configuring at least one of the second plurality of wireless devices to receive the combined signal from the master transceiver, the at least one of the second plurality of wireless devices being configured to determine each of the data packets of the combined signal have been received over the first wireless protocol and wherein the at least one of the second plurality of wireless devices determines all data packets have been received and wherein the at least one of the second plurality of wireless devices is configured to extract data of any packet not received from the second wireless protocol and configuring the at least one of the second plurality of wireless devices to transmit the combined signal over third wireless protocol to a network and providing the second plurality of wireless devices with a camera to form a plurality of cameras and configuring the second plurality of wireless devices to capture images of the first plurality of sources and the master source and wherein the second plurality of wireless devices are configured to transmit the images.

12. The method of claim 11 further comprising monitoring signal strength of the combined signal transmitted over first wireless protocol by the master transceiver.

13. The method of claim 12 further comprising transmitting the combined signal over the second wireless protocol when the first wireless protocol signal strength is below a predetermined threshold.

14. The method of claim 12 further comprising disconnecting the second wireless protocol transmission when the first wireless protocol signal strength is above a predetermined threshold.

15. The method of claim 11 wherein the first wireless protocol is a Bluetooth transmission protocol, the second wireless protocol is a Wi-Fi protocol.

16. The method of claim 11 wherein the third wireless protocol is 5G.

17. The method of claim 11 wherein the extracting of any packet not received from the second wireless protocol is based on a timestamp.

18. The method of claim 11 further comprising configuring the master transceiver to be positioned on a stage.

19. The method of claim 11 further comprising configuring at least one of the second plurality of devices to be positioned off a stage.

20. The method of claim 11 wherein in a third plurality of devices each having a speaker and a wireless antenna to form a plurality of speakers and a third plurality of wireless antennas, wherein each of the third plurality of devices are configured to receive the combined signal from the master transceiver and output the combined signal to its respective speaker.

21. The method of claim 11 further comprising determining whether diversity transmission is enabled before broadcasting the combined signal over the first wireless protocol and the second wireless protocol simultaneously.

* * * * *